(Model.)
2 Sheets—Sheet 1.
J. M. CARRÈRE, Jr.
AUTOMATICALLY OPENING OUTLET FOR BASINS, BATH TUBS, &c.
No. 470,179.
Patented Mar. 8, 1892.
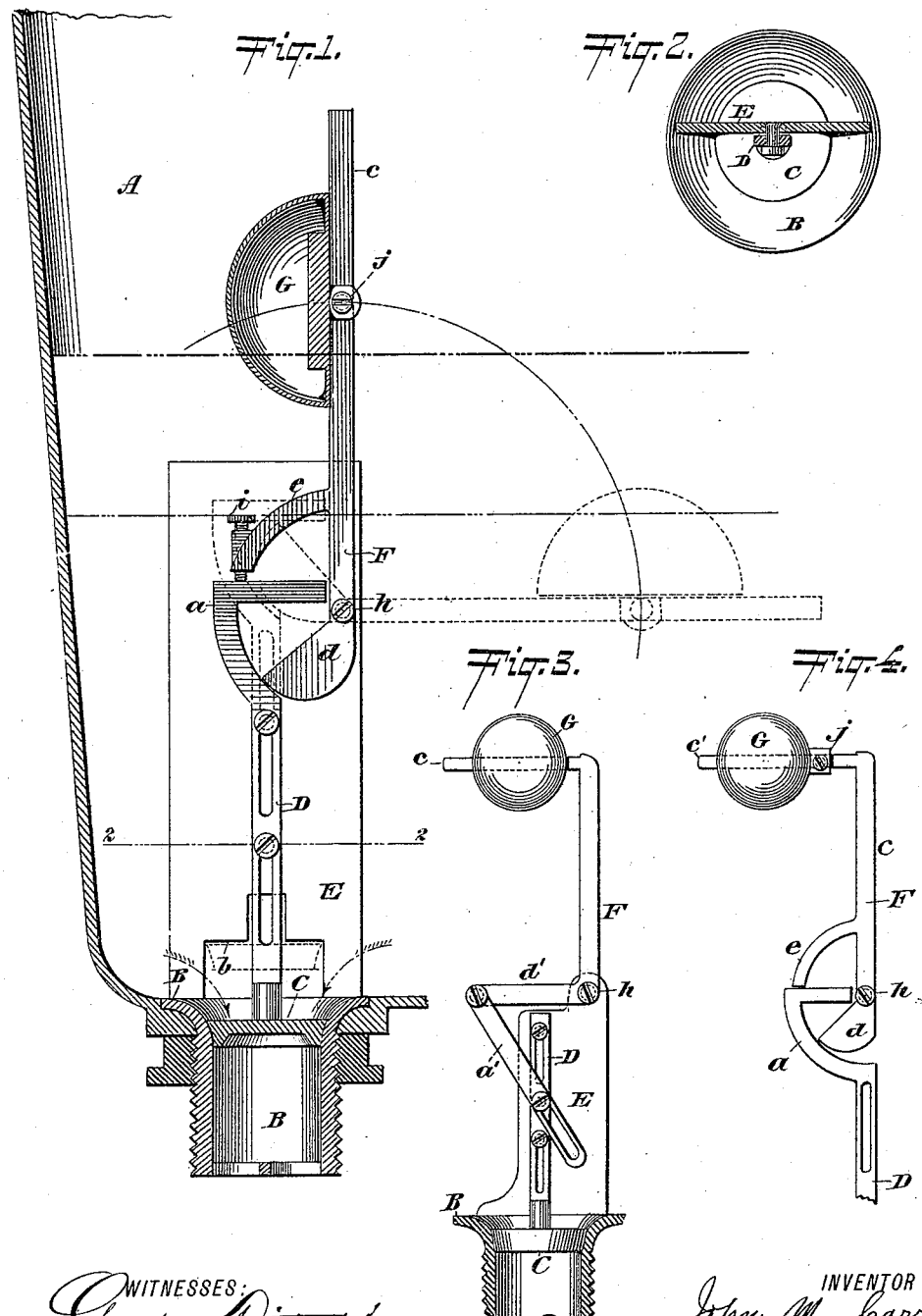
WITNESSES:
Gustave Dieterich
Henry E. Evrding
INVENTOR
John M. Carrère Jr.
BY Briesen & Knauth
his ATTORNEYS

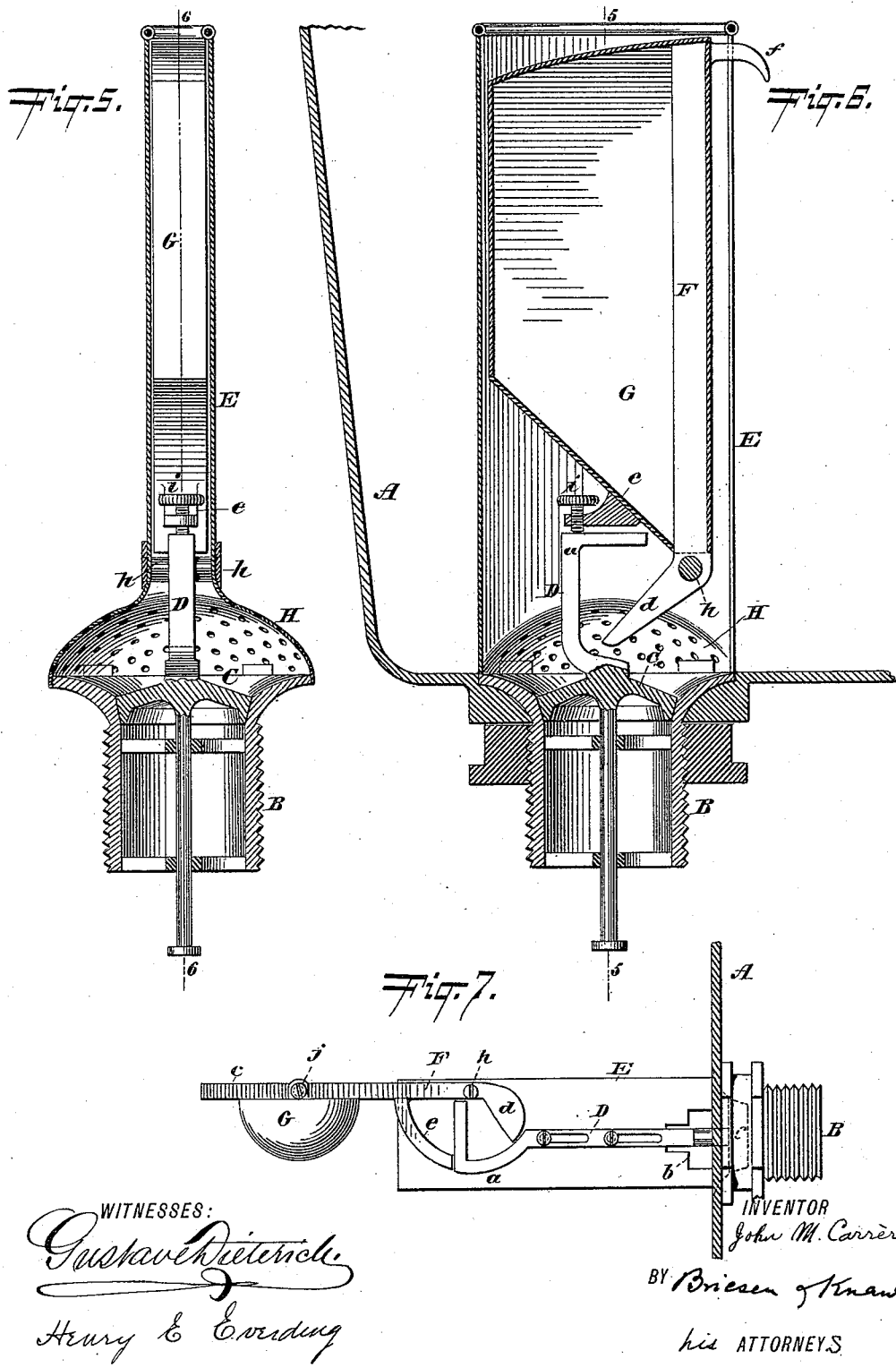

UNITED STATES PATENT OFFICE.

JOHN M. CARRÈRE, JR., OF NEW BRIGHTON, NEW YORK.

AUTOMATICALLY-OPENING OUTLET FOR BASINS, BATH-TUBS, &c.

SPECIFICATION forming part of Letters Patent No. 470,179, dated March 8, 1892.

Application filed June 30, 1891. Serial No. 397,964. (Model.)

*To all whom it may concern:*

Be it known that I, JOHN MERVEN CARRÈRE, Jr., a resident of New Brighton, Richmond county, Staten Island, in the State of New York, have invented a certain new and useful Improvement in Automatic Self-Opening Outlets for Basins, Bath-Tubs, and the Like, of which the following is a specification.

My invention relates to certain new and useful improvements in automatic self-opening outlets for basins, bath-tubs, and the like, and has for its object the providing of certain mechanism, hereinafter more fully described, whereby the outlet-plug or similar contrivance is held closed while there is little or no water in the receptacle and automatically opened when the water in said receptacle reaches a predetermined height.

The invention consists in the combination of parts, hereinafter fully described.

In the drawings, Figure 1 is a vertical section through a bath-tub and its outlet, showing one form of my improvement in position. Fig. 2 is a horizontal section through the line 2 2, Fig. 1. Figs. 3 and 4 are modified forms of the improvement shown in Fig. 1. Fig. 5 is a vertical section of another modification through the line 5 5, Fig. 6; Fig. 6, a section through the line 6 6, Fig. 5. Fig. 7 is a view of a modification working in horizontal plane.

In the drawings, A designates a tank, bath-tub, basin, or similar receptacle having an outlet B, which in Figs. 1, 3, 5, and 6 is shown to be placed in the bottom of said receptacle, but which may also be placed on the side, as shown in Fig. 7. This outlet B is provided with a plug or stopper C, which, in the form of my improvement shown in Figs. 1 and 7, is attached to a slotted shank D, carrying an elbow $a$, said shank being pinned or otherwise loosely attached to a suitable bearing or plate E, upon which it slides. To this plate E or to any other standard is pivoted at $h$ a lever F, provided at its longer end $c$ with a float G, which in Figs. 1 and 7 is shown to be hemispherical in shape, with its flat surface resting or attached to the end $c$ of the lever F and weighted at that point. The lower end of the lever F is provided with an extension $d$, adapted to fit into the elbow $a$ of the shank D, so that when the float and lever are moved through the arc of a circle a corresponding upward or downward movement is transmitted through the extension $d$ to the elbow $a$ to raise or lower the shank D, carrying the plug or stopper C. In Figs. 1, 7, and 4 the arm $c$ of the lever is also shown provided with an arm $e$, which rests upon the elbow $a$ of the shank D to hold the stopper or plug down; but this arm $e$ may be dispensed with altogether, as shown in Fig. 3, it only serving as an additional safeguard to keep the plug closed when there is little or no water in the tank.

In the modification of my invention shown in Fig. 4 the end $c$ of lever F is provided with an arm $c'$, upon which a hemispherical, spherical, or other float rests. Otherwise the device is precisely the same as that shown in Fig. 1.

In the modification shown in Fig. 3 I substitute for the arm $d$ of the lever F and elbow $a$ of the shank D (shown in Fig. 4) an arm $d'$, pivoted to the link $a'$, which is slotted to the shank D.

In the modification shown in Fig. 7 the parts are the same as those shown in Fig. 1, but are arranged horizontally with respect to the bottom of the tank, the outlet B being placed in the side instead of the bottom of said tank.

In the modification shown in Figs. 5 and 6 the outlet is capped by a shield or casing H, which fits over the outlet-pipe above the valve C and is perforated to form a strainer. In this modification the float G is pivoted to the sides of the casing or standard E, as at $h$, and is provided with an arm $d$, adapted to abut against and raise the elbow $a$ of the shank D, which is attached directly to the plug C. The float when operated swings outward from the casing upon its pivot. The arm $d$ elevates the elbow $a$ and shank D and raises the plug or stopper C. An arm $f$ may be attached to the upper end of the float, as shown, to assist in returning the float to an upright position. A set-screw $i$, carried by the arm $e$, forms a means of adjustment of the float G to the shank B. In Figs. 1 and 4 a set-screw $j$ is shown on the float for the purpose of adjusting the position of the float.

In operation the device may be placed in the tank or similar receptacle or in the casing surrounding the same, either vertically, as shown in Fig. 1, or horizontally, as shown in Fig. 7, or in any way which may be deemed preferable by the user. The normal position of the stopper C is closed with the weight of the float out of the center of gravity above the stopper and pressing down upon the shank attached to the same. Water is then admitted until it reaches the float, which is thereby gradually raised, until at last its weight falls upon the other side of the center of gravity, as shown by dotted lines in Fig. 1. The falling float, assisted by the weight of the lever F, raises the shank D and stopper C and allows all the water to pass out. In the horizontal position shown in Fig. 7 the float always rests above the center of gravity, and the action of the water running in elevates it still farther above this center, and so opens the stopper or valve. When in this position sufficient water has run out, the float falls with the level of the water and partially closes the outlet. By this continual opening and shutting of the outlet the water in the tank is maintained at a constant height.

It is obvious that many changes may be made in the means for securing the results of my invention without departing from its spirit. Thus instead of a plug or stopper any suitable cut-off or other valve may be used. The size and shape of the float may be varied to suit the convenience of the user. The levers or other equivalents used, as shown in the drawings, to elevate or raise the stopper may be so arranged that the stopper or valve can be lowered to accomplish the same result. The float may be either weighted or else arranged so that its bulk will fall on the opposite side of the support when it is tilted by the inflowing water. The float may be combined with other suitable devices to return it to its normal position when the water has fallen in the tank to any distance. The device may be placed within the tub or within the casing surrounding the same, and serves to render the ordinary overflow unnecessary.

What I claim is—

1. The combination, in a tank or similar liquid-receptacle provided with an outlet and a stopper, of a float on the end of a pivoted lever and a positive connection between said lever and stopper, the float and stopper being on opposite sides of the pivot of said lever, all arranged so that the float when it descends moves the said lever and said lever raises said stopper, substantially as described.

2. The combination, in a tank or similar liquid-receptacle provided with an outlet, of a lever F, having arm $d$ and carrying the float G above its pivot, with the shank D, said arm $d$ of lever F engaging with said shank D and stopper C, said stopper carrying said shank, and the standard E, substantially as described.

3. The combination, in a tank or similar liquid-receptacle provided with an outlet, of the perforated casing H, surrounding said outlet, with the float-lever F, having arm $d$, float G, carried by said lever above its pivot, and shank D, said arm $d$ of lever F engaging with said shank D and stopper C, substantially as described.

4. The combination of the outlet-pipe B with the plug C, its shank D, elbow $a$, lever F, having arms $d$ and $e$, and float G, said float being above the pivot of said lever and carried by arm $e$ thereof, said arm $d$ of lever F engaging with the elbow $a$ of said shank D, substantially as herein shown and described.

5. The combination of the outlet-pipe B with the plug C, its shank D, elbow $a$, lever F, having arms $d$ and $e$ and adjusting-screw $i$, and float G, said float being carried by arm $e$ above the pivot of said lever, said arm $d$ of lever F engaging with elbow $a$ of shank D, substantially as herein shown and described.

JOHN M. CARRÈRE, Jr.

Witnesses:
HARRY M. TURK,
L. M. WACHSCHLAGER.